US005214787A

United States Patent [19]

Karkota, Jr.

[11] Patent Number: 5,214,787

[45] Date of Patent: May 25, 1993

[54] MULTIPLE AUDIO CHANNEL BROADCAST SYSTEM

[76] Inventor: Frank P. Karkota, Jr., Cowdry Hill Rd., P.O. Box 3251, Westford, Mass. 01886

[21] Appl. No.: 575,940

[22] Filed: Aug. 31, 1990

[51] Int. Cl.[5] .......................... H04H 1/04; H04B 1/06

[52] U.S. Cl. ....................................... 455/3.2; 455/45; 455/73; 455/93; 455/102; 455/103; 455/180.2; 455/67.5; 370/69.1; 370/73

[58] Field of Search ................... 455/63, 93, 102, 103, 455/180.1, 180.2, 3.2, 45, 46, 47; 358/143, 144, 187; 370/69.1, 73, 75, 124

[56] References Cited

U.S. PATENT DOCUMENTS

| | | | |
|---|---|---|---|
| 3,332,038 | 7/1967 | Stanley et al. | 370/69.1 |
| 3,452,156 | 6/1969 | Englebrecht | 370/69.1 |
| 4,130,801 | 12/1978 | Prygoff | 455/3.2 |
| 4,363,132 | 12/1982 | Collin | 455/102 |
| 4,398,216 | 8/1983 | Field et al. | 358/144 |
| 4,720,873 | 1/1988 | Goodman et al. | 455/3.2 |
| 4,806,881 | 2/1989 | Ives et al. | 455/102 |
| 4,841,571 | 6/1989 | Kage | 455/102 |
| 4,905,303 | 2/1990 | Johnson, Jr. et al. | 455/45 |
| 5,045,799 | 9/1991 | Holecek | 455/102 |
| 5,073,930 | 12/1991 | Green et al. | 455/3.2 |

FOREIGN PATENT DOCUMENTS

| | | | |
|---|---|---|---|
| 0073147 | 6/1980 | Japan | 455/63 |
| 0049437 | 2/1989 | Japan | 455/63 |

OTHER PUBLICATIONS

Abbott, Transmission of Multiple Television Programs Via a Single Satellite Transponder Channel, Jan. 1979.

*Primary Examiner*—Reinhard J. Eisenzopf
*Assistant Examiner*—Timothy H. Keough
*Attorney, Agent, or Firm*—Robert K. Tendler

[57] ABSTRACT

A microwave system is provided for the broadcast of multiple channels of audio programming to a wide listener base, in which noise-free transmission of multiple audio channels is accomplished through microwave transmission followed by down converting the received signal to television band frequencies, accomplished in one embodiment through the use of a single MDS channel.

6 Claims, 2 Drawing Sheets

MULTIPLE AUDIO CHANNEL BROADCAST SYSTEM

FIELD OF INVENTION

This invention relates to the transmission and distribution of multiple channels of audio programming such as music and more particularly to microwave transmission of the audio channels followed by down conversion to TV channel frequencies.

BACKGROUND

In the past either telephone lines or subsidiary communication authorization (SCA) systems which involve subcarriers on FM broadcast stations were utilized to transmit background music and the like. Land line systems are expensive, while SCA systems which broadcast on subcarriers of FM radio stations in the 88-108 MHz band, are prone to noise and only facilitate two good quality subcarriers. Moreover the bandwidth of both systems is only 5 KHz which eliminates most high frequency audio components.

On the other hand, multi-point distribution system (MDS) channels operating at 2 GHz have in the past been utilized for dissemination of video to a limited number of locations. Originally, the MDS common carrier system was authorized for only point to point video applications. Because MDS systems were used exclusively for video programs, this particular service was underutilized and the Federal Communications Commission has now provided licenses for audio programs to be transmitted via microwave as a replacement for sub-carrier authorization service or the use of telephone lines.

In order to adapt the video MDS system to the provision of multiple audio programs, in the past it has been suggested that one transmit audio program material on the microwave TV audio channel, with sub-carriers multiplexed to provide for multiple program channels. This permits a 200 KHz audio frequency response range so as to accommodate and surpass the requirements of high fidelity material. The problem with this system is that since there is no video transmitted there is an exorbitant amount of wasted energy transmitted. This is because video related signalling such as the video carrier and color bursts are transmitted even if there is no video. This means that the effective power of the audio channel is reduced dramatically. For instance, assuming 100 total watts power, the entire audio transmission can only utilize approximately 25 percent of the allocated power. This dramatically reduces the possible coverage to a quarter of what it could have been had all of the energy been concentrated in audio programming. Note, with respect to MDS systems the transmission is from a single transmitter location to multiple points which gives rise to the designation of multiple-point distribution system.

SUMMARY OF THE INVENTION

As the solution to the problem of power and range, the subject system utilizes individual audio sub-carriers throughout what was originally the video band width. To this end FM subcarriers are generated, one each corresponding to an audio channel, with the FM subcarriers being combined and transmitted at microwave frequencies to remote locations where they are down-converted to TV channels and detected by FM detectors, each tuned to a different subcarrier frequency.

Here in one embodiment numbers of subcarriers, each tuned to a different frequency corresponding to a different audio channel, are combined and used to modulate a 2 GHz AM transmitter. The output of the transmitter is filtered to remove the AM carrier, with the resultant signal amplified and coupled to an omnidirectional microwave antenna. By the utilization of this type of system the filter normally utilized after the AM modulation of the video signal in the above multiplexed MDS service can now be retuned to eliminate the carrier, thereby providing nearly double the power for the audio programs. The result is the transmission of individual FM subcarriers, one each attributable to a different audio channel or program, with the AM carrier and unwanted sidebands removed. The result is that the entire transmission power is dedicated to these subcarriers. It will be appreciated that these FM subcarriers are in essence the same as FM radio stations found on the FM broadcast band. The difference is that the FM subcarriers of the subject system appear within one of the channels designated for MDS service, for instance the 2150 to 2156 MHz band. What this means is that the audio signals are transmitted in the microwave region to various locations.

At each recipient location the microwave signal is heterodyned to TV channel 5 or 6, where through the utilization of conventional FM receiver technology the signals are individually detected and reproduced on different audio channels corresponding one each to the individual programs.

It is therefore possible to provide 5 or more programs on a single MDS channel. The resultant power for multi-channel audio programming is for instance 20 watts per channel for a 5 channel system, whereas only a few watts per channel is available with the prior multiplexed MDS video system.

Moreover, the receiver section for the subject system is greatly simplified because only two basic components are required for reception; namely the integrated antenna feed, low-noise amplifier and down converter package at the antenna; and a basic FM receiver. The FM receiver is easily tuned to the appropriate subcarrier frequency corresponding to the particular program channel to be received. This is in contradistinction to the MDS multiplexed method of providing audio channel de-multiplexing in that in the multiplexed system the video carrier has to be mixed with the audio carrier in an amplitude modulation detector to obtain an inter-carrier sound signal. This has to be limited and further demodulated in an FM detector. Subsequently the individual sub-carriers have to be demodulated to extract their individual informational content. Obviously, such process is both complex and inefficient. The basic problem with such a system is that it uses inter-carrier sound which requires all of the complexity of TV reception. Moreover, such a system is subject to interference present on the video carrier. The result is also that the entire multiplexed system has extremely poor sensitivity because of the wider bandwidth involved in obtaining all of the information including the carriers and the subcarriers. While the subject system requires a stable oscillator, it is not a difficult requirement that the local oscillator associated with the down converter have a frequency stability of 0.001%.

The subject system utilizing a single audio channel per subcarrier as opposed to a multiplexed channel provides greater power per channel of program material, less interaction between program sources, greater simplicity in transmitter and receiver design and ultimately less noise and better range.

More particularly, a microwave common carrier broadcast system is provided for the transmission of multiple audio channels to large numbers of receivers in a coverage area, in which noise-free transmission is accomplished through microwave transmission followed by down converting the received signal to television band frequencies.

In one embodiment, multiple audio frequency sources are applied to a corresponding number of audio frequency subcarrier generators, the outputs of which are combined at a combiner, with the output of the combiner driving a 2 GHz AM transmitter, the output of which is filtered and linearly amplified prior to the coupling of the linearly amplified output to a suitable antenna. Here the AM transmitter is in essence a heterodyne mixer, and the in-line filter is tuned to the carrier frequency and one set of side bands. When the audio frequency carrier generator outputs are mixed in the AM transmitter with the carrier frequency, sum and difference components are generated corresponding to the carrier and the individual audio generator subcarrier frequencies. The in-line filter is set up to eliminate the carrier frequency of the AM transmitter and the undesired side bands produced in the mixing process.

The output of the system is therefore a carrier-removed transmission such as a single side band transmission with the exception that the output signal to the antenna is a number of independent frequency modulated carriers. While it would be possible to downconvert the 2 GHz transmission to the low end of the FM broadcast band, this approach was rejected because of interference from local FM broadcast stations and particularly low power small college stations that are located in the immediate vicinity of the receiver. Rather, a local oscillator frequency was chosen so that with downconversion the received signal would be in the bands corresponding to TV channels 5 and 6. This eliminates the interference Problems having to do with feedthrough associated with the aforementioned local stations. The choice of microwave transmission coupled with downconverting to the TV band provides an interference free system in which there are a number of readily available FM/TV band receivers, as opposed to the utilization of the FM radio band which while interference makes such a system unusable.

As to the receiver section, a microwave antenna system having a specialized feed, a low noise amplifier and a down converter, all at the antenna, down converts the received signal to television channels 5 or 6 depending on the availability in the given area. The output of the down converter is supplied to an FM receiver tuned to the subcarrier frequency corresponding to the desired audio source. It will be appreciated that each of the individual audio subcarrier generators is tuned to a different frequency within the chosen MDS channel. In one embodiment the MDS microwave channel is between 2150 MHz and 2156 MHz, with each of the audio frequency carrier generators being tuned to a frequency between those two limiting frequencies. It will be appreciated that at the receiving site the down converter heterodynes the microwave signal with an intermediate frequency signal thereby to provide a resultant signal in either the channel 5 or channel 6 band. Channel 5 and channel 6 operate between 76 and 88 MHz making the required down conversion from 2 GHz to approximately 80 MHz.

As to the transmitting section of the system, in an alternative embodiment each audio frequency source has associated with it a separate 2 GHz FM transmitter, the outputs of which are combined in a combiner and then linearly amplified, with the amplified signal being provided to the transmitting antenna.

BRIEF DESCRIPTION OF THE DRAWINGS

These and other features of the subject invention will be better understood taken in conjunction with the Drawings of which.

DETAILED DESCRIPTION

Figure 1:
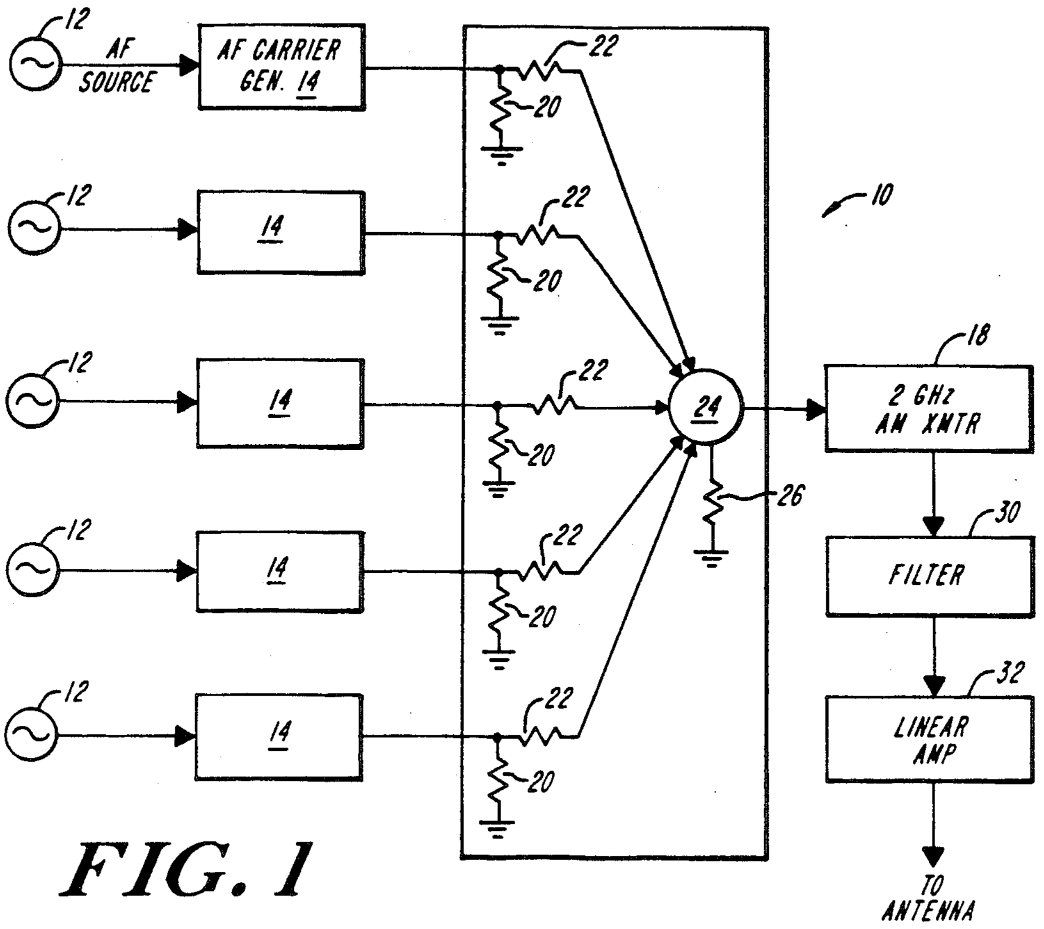
FIG. 1 is a block diagram of the MDS transmitter portion of the subject system illustrating audio frequency sub-carrier generation, a combiner circuit for combining the subcarriers and a microwave AM transmitter, the output of which is filtered and linearly amplified.

Referring now to FIG. 1, in one embodiment the transmitter section 10 of the subject system includes a plurality of audio frequency sources 12 coupled to a like plurality of audio frequency sub-carrier generators 14 which are in turn coupled to a combiner network 16 which involves a network of resistors to prevent interaction between the signals. Each individual audio frequency sub-carrier generator can be the conventional 4.5 MHz generator normally used for the generation of the audio portion of a video signal. However these generators are modified to operate at frequencies from a few hundred KHz to the band width of the MDS channel, e.g. 4 MHz or 6 MHz. Typically, however, the audio frequency carrier generator produces a carrier having a frequency for instance of 1 MHz, 2 MHz, 3 MHz, 4 MHz and 5 MHz corresponding to 5 audio channels. The exact frequencies are selected according to the desired system parameters. Each of the audio frequency sub-carrier generators is a frequency modulated carrier generator modulated with a deviation corresponding to a maximum band width of a couple hundred KHz in the embodiment presently described. Each of the audio frequency sub-carrier generators includes its own pre-emphasis network which can typically be set at 75 micro-seconds and is commercially available from Comwave Inc. of Mountain Top Pa. The output of each of these generators is therefore an FM modulated signal having its own unique carrier frequency, with the center frequency being that associated with a particular channel of audio frequency programming to be demodulated at the receiver section of the subject system.

The output of the audio frequency sub-carrier generators is applied, as mentioned before, to a resistor network which forms combiner 16, with the resistor network forming summing junctions, with the resistors in each of the legs of the summing junction providing a termination isolation for each of the generators, and with resistor values being such that the individual nodes match to the impedance of an AM microwave transmitter 18 here illustrated to be a 2 GHz transmitter. In this case each output of the audio frequency carrier generators is loaded with a resistor 20 to ground, with the output of each individual carrier generator passing through a resistor 22 to a summing node 24 having a resistor 26 to ground. The purpose of the provision of the resistive combining network is to match the output impedance of each individual carrier generator to the input impedance of transmitter 18 and to provide isolation between the generators. It will be appreciated that the AM transmitter, in one embodiment is a one watt 2 GHz transmitter modulated with the signal available at output node 24. In one embodiment transmitter 18 is tuned to 2150 MHz with the output being supplied to a filter 30 the purpose of which is to remove the 2 GHz carrier, or in the above example the 2150 MHz carrier. The filter also is designed to eliminate undesired side bands generated by the mixing process of the carrier and the signal from node 24. These are commercially available as vestigual side band filters retuned to the carrier frequency which provides the desired result. A vestigual side band filter typically leaves the carrier and part of the undesired side band. Such filters are available from Comwave Inc. of Mountain Top, Pa., which are easily retuned cavity filters.

The resultant signal from the output of filter 30 is a plurality of FM modulated carriers each centered about 2151 MHz, 2152 MHz, 2153 MHz, 2154 MHz and 2155 MHz based upon the prior example of setting the audio frequency carrier generators to 1 MHz, 2 MHz, 3 MHz, 4 MHz, and 5 MHz.

The output of the filter is applied to a linear RF amplifier 32, typically a 50 or 100 watt unit, the output of which is coupled to a conventional omni-directional microwave antenna (not shown).

Figure 2:
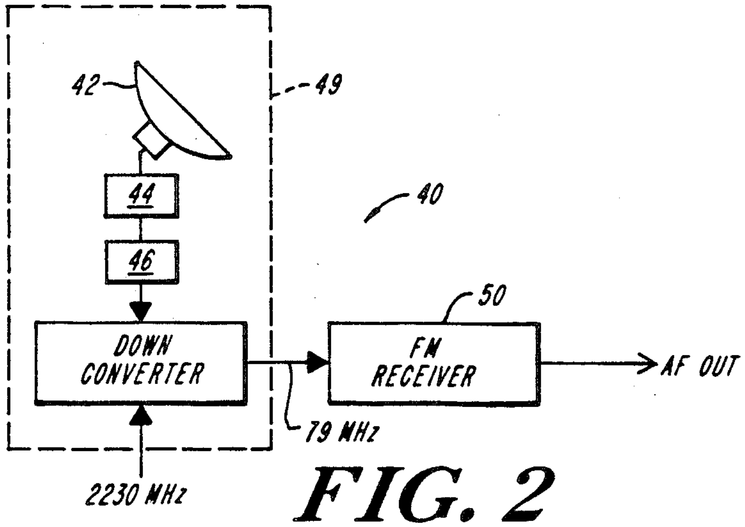
FIG. 2 is a block diagram illustrating the receiver portion of the subject system illustrating a low noise down converter coupled to a conventional FM receiver; and, FIG. 3 is a block diagram of an alternative transmission system utilizing multiple FM microwave transmitters the outputs of which are combined and linerally amplified.

Referring now to FIG. 2 for the receive section here illustrated at 40 an MDS antenna 42 typically either a YAGI or a parabolic dish is coupled through a feed 44 to a low-noise amplifier 46 all of which are located at the feed to the antenna. The resultant signal is down converted at the antenna by a down converter 48 of conventional design tuned such that its local oscillator is tuned to a frequency of 2330 MHz. Thus when the 2251 MHz signal is heterodyned therewith, the resultant signal is a signal at 79 MHz which is within the channel 5 TV band. The FM receiver, here illustrated at 50 is a conventional FM receiver used for demodulating the audio components of the 79 MHz FM modulated carrier which is applied thereto. This FM receiver is standard in all aspects with the exception that it is not variable tuned but rather has its frequency controlled by stable frequency controlling elements which are fixed. This includes crystals, phase lock loops, or other conventional means of automatic frequency control. It is however important to note that the receiver is specially configured so as to respond to one of the multiple audio frequency program channels and, should program selectivity be appropriate, receiver 50 may be provided with a front panel switch to change the frequency of the receiver to correspond to one of the program channels. Note that the bandwidth of the mixer of the receiver is augmented to preclude the necessity of retuning for each program channel. Moreover, the receiver is provided with a 75 microsecond de-emphasis.

In operation, various audio frequency sources corresponding to predetermined channels of programming are generated and supplied at the transmitting station to transmitter 18. The programs are transmitted omni-directionally, with the intent that the signals be picked up by directional antennas having a low noise characteristic at which point the signals are down converted from the original microwave frequencies to frequencies compatible with the channel 5 and 6 frequency bands. The result is that with hundred watt transmitters, coverage is typically line of sight, although because of refraction and reflection of the signal, adequate reception can be achieved beyond the nominal line of sight distance. Moreover, the signals are relatively noise-free, thereby eliminating the problem of complicated filter circuitry to eliminate cross talk that would be present if the FM broadcast band was utilized. Because of the utilization of the MDS system utilizing microwave frequencies and omni-directional transmission, it is possible to increase the range of such a system over that associated with FM broadcasting due to the availability in this frequency range of extremely directional high-gain antennas, and very low atmospheric noise. Also electromagnetic radiation interference is considerably less of a problem at microwave frequencies providing an exceptionally quiet system. In a preferred embodiment, the bandwidth for each of the audio frequency sub-carrier generators is on the order of 200 KHz due to the ready availability of inexpensive FM receiver band pass filters which can easily handle the proposed 200 KHz maximum band width for each of the audio channels.

Figure 3:
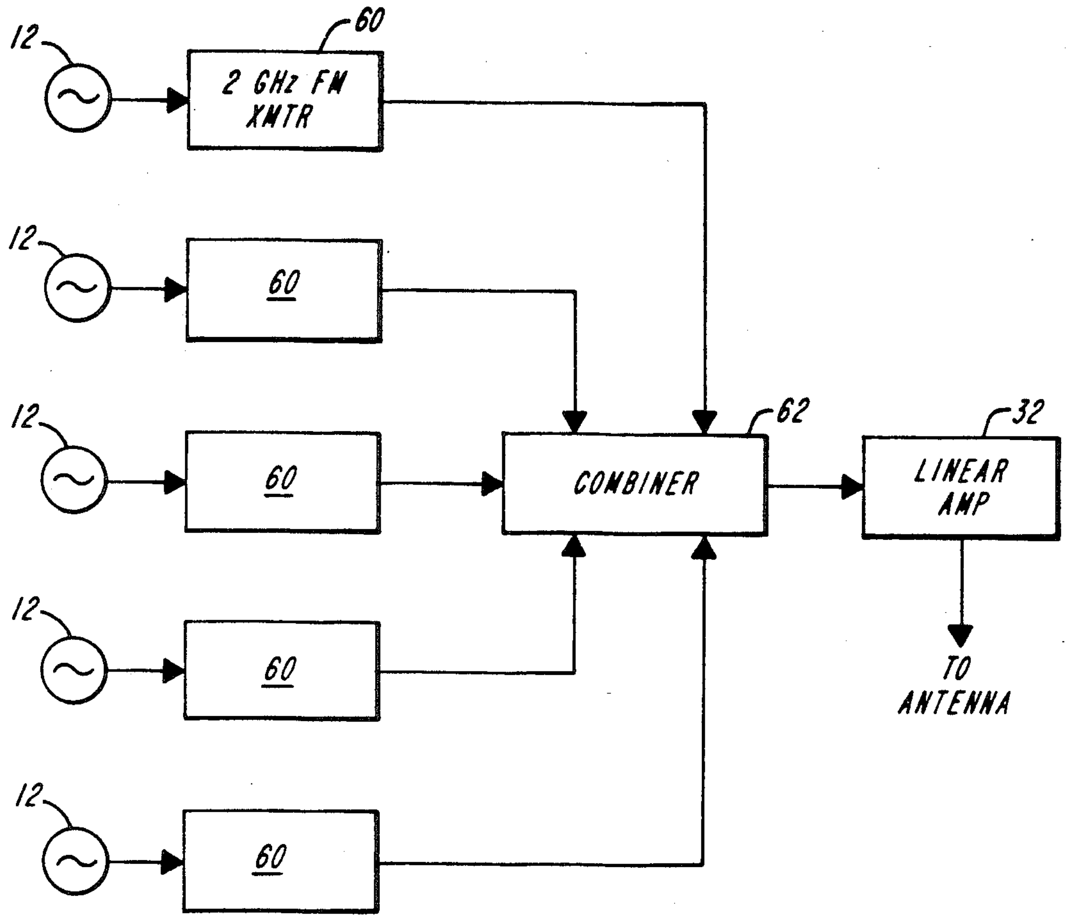

Referring now to FIG. 3 in an alternative embodiment each audio frequency source 12 is coupled instead to a 2 GHz FM transmitter 60 tuned in a preferred embodiment for instance to 2151, 2152, 2153, 2154 and 2155 MHz respectively to correspond to the above-mentioned example. The outputs of these transmitters which are typically one watt, are applied to a microwave combiner circuit 62. This type of combiner can include a resistor network or typically includes cavity mixers or circulators. The output of combiner 62 is coupled to linear amplifier 32 which can be identical to the linear amplifier of FIG. 1.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. A system for the noise-free broadcasting of audio programming to a wide listener base comprising:
- means for broadcasting independent frequency modulated microwave carriers modulated only with audio program material, one each carrier corresponding to a different channel of audio program material, said broadcasting means including means for generating said independent carriers, means for combining said generated carriers to produce a combined signal, an omnidirectional antenna and means for coupling said combined signal to said antenna; and,
- means for receiving the broadcast independent microwave carriers to produce corresponding received signals, downconverting said received signals to TV band frequencies and demodulating at least one of the downconverted carriers so as to extract the corresponding channel of audio program material.

2. A microwave system for the noise-free broadcasting of audio programming to a wide listener base, comprising:

means for generating at least one channel of audio programming;

an omnidirectional microwave transmitting system including a transmitter having a modulator and, means for providing said modulator only with said audio programming so as to produce a corresponding modulated independent microwave carrier, each modulated independent microwave carrier corresponding to an audio channel, an omnidirectional antenna, and means for coupling each said corresponding independent carrier to said omnidirectional antenna for the transmission of each said modulated independent microwave carrier;

means for receiving each said transmitted independent microwave carrier and for downconverting each received independent microwave carrier to television band frequencies to produce a downconverted signal; and, means for demodulating the downconverted signal to reproduce said audio programming.

3. The system of claim 1 wherein said modulating means includes an audio frequency FM carrier generator, wherein said transmitter is an AM transmitter modulated by said audio frequency FM carrier and further including a filter coupled between said transmitter and said antenna for removing AM carrier components from the transmitted signal.

4. The system of claim 3 wherein said audio program generating means include multiple independent FM audio programming generators, each tuned to a different carrier frequency for producing signals corresponding to multiple channels of audio programs, and means for combining the outputs of said generators for modulating said transmitter.

5. The system of claim 3 wherein said demodulating means includes an FM receiver.

6. The system of claim 1 wherein said audio program generating means includes means for generating a plurality of signals corresponding to multiple channels of audio programming, and wherein said microwave transmitting system includes a like plurality of transmitters, each coupled to a different one of said plurality of signals and each tuned to a different microwave frequency, means for combining the outputs of all of said transmitters, and means for coupling the combined outputs of said transmitters to said antenna.

* * * * *